Patented May 9, 1939

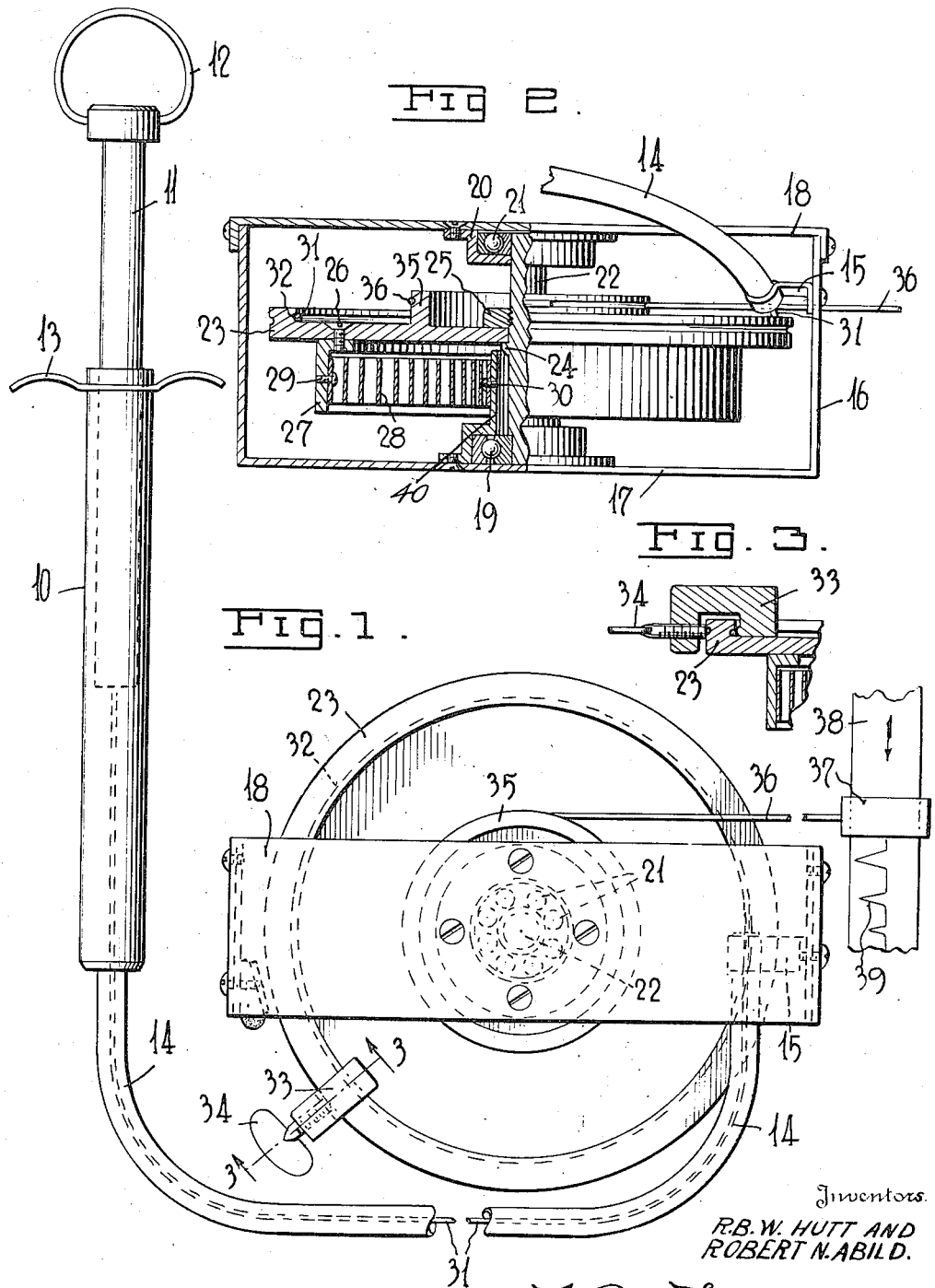

2,157,790

UNITED STATES PATENT OFFICE 2,157,790

MEASURING ENERGY IN PSYCHOLOGICAL EXPERIMENTATION

Robert B. W. Hutt, Hartford, and Robert N. Abild, East Hartford, Conn., assignors to trustees of Trinity College, Hartford, Conn.

Application July 20, 1938, Serial No. 220,384

8 Claims. (Cl. 265—20)

In experimental work it is frequently desirable to measure the amount of work done by a single set or group of muscles. Continuous and repeated use of muscles produces fatigue and it is frequently desirable to determine what effect fatigue has upon muscles being tested over a considerable period or from time to time during the period.

It is a purpose of the present invention to produce a simple, accurate and relatively cheap device to this end. While the same principle may be applied to numerous muscles or sets of muscles it may be especially adapted to certain specific muscles. The invention will be described as applied to measure the muscles of the hand specifically involving the thumb and one or more fingers.

In order to perform the work satisfactorily it is necessary to have a device which will segregate the work done by the specific muscles under investigation. It is desirable to measure the activities of the muscles being measured uninfluenced by the work of other muscles. As the muscles operate fatigue will be introduced. The fatigue may be increased by causing the muscles to work against an opposing force. It may be preferable to arrange means for varying or adjusting the opposing force. Some means for measuring work and the fatigue are desirable and it may be convenient to provide means for recording energy of the muscles in repeated flexions and as the fatigue appears. Such recording activity may be associated with timing mechanism and records of the various experimental activities may thus be compared when desired.

A machine showing a preferred form in which the invention may be embodied is illustrated in the accompanying drawing in which Figure 1 is a plan view of a machine. Fig. 2 is a side elevation, the left portion being in section. Fig. 3 is a fragmentary vertical section along the line 3—3 of Fig. 1 showing details of mechanism used in adjusting a part of the mechanism.

A guide member 10 which may be in the form of a tube may have riding in it a plunger 11. A ring or thumb or finger hold 12 is shown on the end of the plunger 11. A bracket 13 rigid on the tube 10 forms a gripping device for one or more fingers. The thumb may be inserted through the ring 12 and one or more fingers caused to engage the gripping member 13 or the reverse. The plunger may then be forced into the tube 10 by drawing in the thumb and fingers which movement may be accomplished entirely by the muscles of the thumb and finger. Extending from the tube 10 is shown a tube 14 which may be of any suitable length and material and may be flexible or rigid as desired. The end of the tube 14 is held in a brace or bracket 15 carried by an upright 16 at one side of the frame of the machine.

The frame of the machine has a base member 17 and a top member 18 which may be removed for repairs, adjustment, etc. Carried by the base member 17 is a hollow pillar 40 at the lower end of which is a vertical ball bearing 19. Depending from the top 18 is a bracket 20 carrying a ball bearing 21. Riding in the ball bearings 19 and 21 and within the hollow pillar 40 is a vertical shaft 22. Mounted on the vertical shaft 22 is a disc 23 which is held rigidly against a shoulder 24 on the shaft 22 by means of a nut 25. Depending from the disc 23 and held therein by screws 26 is a collar 27. To the collar 27 one end of a coil spring 28 may be fastened by some such means as the screw 29. The other end of the coil spring is fastened to the stationary tubular member 40 by some such means as the screw 30.

Attached to the plunger 11 and passing through the tube 14 is a wire 31 (which may be referred to as a Bowden wire) which emerges from the tube 14 substantially tangentially to the disc 23. As it emerges from the tube 14 the wire 31 enters an inwardly opening groove 32 in the disc 23. A clamping member 33 has one leg pressing against the wire 31 and carries in its other leg a thumb screw 34 which may be adjusted against the rim of the disc 23 to hold the wire 31 against movement in the slot 32 relative to the disc 23.

It will be observed that when the muscles force the plunger 11 into the tube 10 the wire 31 will force the disc 23 to rotate against the opposition of the coil spring 28. The disc 23 carries an upwardly projecting collar 35 which may be of smaller diameter and to which may be fastened one end of a wire 36. The other end of the wire 36 may extend outwardly to a stylus (not shown) carried by a guideway 37 over a recording ribbon 38 which may be arranged to move regularly and constantly by any suitable mechanism (not illustrated).

Since the radius of the collar 35 is less than that of the disc 23 the wire 36 will move a less distance than the piston or plunger 11 or the wire 31. The movement of the wire may be relied on to give accurate relative indications of the plunger movements and it may be used alone or in connection with any suitable indicating or recording device one example of which is described.

It will be observed that as the disc 23 moves it will move the wire 36 and cause the stylus in the guide 37 to make a mark 39 on the moving strip of ribbon 38. Repeated movements of the plunger 11 will cause fatigue in the muscles involved and the relative energy used by the muscles in repeated movements of the plunger 11 may be observed from the variations in the contours of the markings 39 on the ribbon 38.

The energy expended in moving the plunger 11 will vary with the strength applied by the coil spring 28 and the amount and time of fatigue may vary as the strength of the spring 28 varies. The thumb screw 34 may be operated to release the wire 32 and in this condition the disc 23 may be rotated without affecting the wire 32. Rotation now of the disc 23 will wind or unwind the spring 28 and thus vary its effective strength in the machine. Thus when the thumb screw 34 has been loosened the disc 23 may be turned and then the thumb screw 34 may be again tightened to cause the effect of the spring 28 to be different from its effect before adjustment.

It will thus be seen that by a very simple structure described the energy and fatigue of specific muscles may be studied.

A specific structure has been described but the invention may be embodied in other forms.

We claim as our invention:

1. A testing machine comprising a guide member, a plunger in the guide member, a tube extending from the guide member, a wire in the tube connected at one end with the plunger and moving with the plunger, a rotatable disc to which the other end of the wire is attached, a bearing shaft about which the disc rotates, an adjustable counterforce mechanism between the disc and the bearing shaft, and a second wire moving with the disc adapted to indicate relative movement between the guide member and plunger.

2. A testing machine comprising a guide member, a plunger in the guide member, a wire in the guide member connected at one end with the plunger and moving with the plunger, a rotatable disc to which the other end of the wire is attached, a bearing shaft about which the disc rotates, an adjustable counterforce mechanism between the disc and the bearing shaft, and a second wire moving with the disc adapted to indicate relative movement between the guide member and plunger on a reduced scale.

3. A testing machine comprising a guide member, a plunger in the guide member, a wire connected at one end with the plunger and moving with the plunger, a rotatable disc to which the other end of the wire is attached, a bearing shaft about which the disc rotates, an adjustable counterforce mechanism between the disc and the bearing shaft, and means for directly indicating the amount of rotation of the disc.

4. A testing machine comprising a guide member, a plunger in the guide member, a wire in the guide member connected at one end with the plunger and moving with the plunger, a rotatable disc to which the other end of the wire is attached, a bearing shaft about which the disc rotates, an adjustable counterforce mechanism between the disc and the bearing shaft, and a second wire attached to the disc on a shorter radius than the attachment of the first wire and adapted to indicate relative movement between the guide member and plunger.

5. A testing machine comprising a guide member, a plunger in the guide member, a tube extending from the guide member, a wire in the tube connected at one end with the plunger and moving with the plunger, a rotatable disc to which the other end of the wire is attached, a bearing shaft about which the disc rotates, an adjustable coil spring between the disc and the bearing shaft, and a second wire moving with the disc adapted to indicate relative movement between the guide member and plunger.

6. A testing machine comprising a guide member, a plunger in the guide member, a grip on the guide member, a grip on the plunger, a wire extending from the plunger, yieldable means connected with said wire for opposing movement of the plunger, and adjustable means to vary the resistance to movement between the plunger and guide member.

7. A testing machine comprising a guide member, a plunger in the guide member, a grip on the guide member, a grip on the plunger, a casing having a yieldable resistance element, an indicator actuated by movement of the yieldable element, and a Bowden wire attached to the casing having one end of the transmission element thereof connected to the yieldable element and having the other end thereof connected to the plunger.

8. A testing machine comprising a guide member, a plunger in the guide member, a grip on the guide member, a grip on the plunger, a wire extending from the plunger, yieldable means connected with said wire for opposing movement of the plunger, adjustable means to vary the resistance to movement between the plunger and guide member, and means for recording the relative extent of movement of successive movements of the plunger.

ROBERT B. W. HUTT.
ROBERT N. ABILD.